March 14, 1933.   R. B. LEWIS   1,901,460

DROP TESTING MACHINE

Filed April 17, 1930   3 Sheets-Sheet 1

INVENTOR
Robert B. Lewis,
BY
Robert M. Barr.
ATTORNEY

March 14, 1933. R. B. LEWIS 1,901,460
DROP TESTING MACHINE
Filed April 17, 1930 3 Sheets-Sheet 3

INVENTOR
Robert B. Lewis,
BY
Robert M. Barr
ATTORNEY

Patented Mar. 14, 1933

1,901,460

UNITED STATES PATENT OFFICE

ROBERT B. LEWIS, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA

DROP TESTING MACHINE

Application filed April 17, 1930. Serial No. 444,895.

The present invention relates to testing machines and more particularly to the testing of the strength of materials by subjecting the material under test to a number of impacts imposed by a weight dropping from predetermined heights.

Testing machines of the character to which this invention relates and as heretofore constructed have been lacking in accuracy and have inherent faults which render very questionable the results obtained thereby. Among some of these inherent disadvantages is that due to impacts upon the material following the rebound of the weight after it has concluded the real working impact, that is to say, in prior drop weight testing machines where the weight for example is dropped from a height of two feet it will rebound several inches and then fall to strike another blow upon the material which can not be measured. Hence the impact testing of the material was made in a machine which not only delivered a succession of impacts from known altitudes but also delivered a series of impacts from unknown altitudes brought about by the rebound of the weight to thereby cause inaccurate and confusing results. Furthermore the lifting mechanism for the weight has heretofore had its force applied eccentrically so that the weight and its guides are placed under side strain during operation resulting in loss of efficiency and increased wear.

Some of the objects of the present invention are to provide a machine in which all the defects and disadvantages of prior guillotine type machines are overcome; to provide a testing machine wherein impacts upon the material undergoing test only take place by the dropping of the weight from the same predetermined altitudes; to provide a testing machine of the drop weight type wherein inaccuracies of measurement due to rebound are entirely eliminated; to provide a testing machine of the impact drop weight guillotine type wherein the testing weight is automatically caught and held supported after each rebound from a working impact; to provide a testing machine of the drop type wherein variations in altitude of the weight can be quickly and readily made at will or automatically increased to requirements; to provide a testing machine wherein the inertia of the weight is overcome without transmitting shock and strains to the operating parts of the machine; and to provide other improvements as will hereinafter appear.

Figure 1:
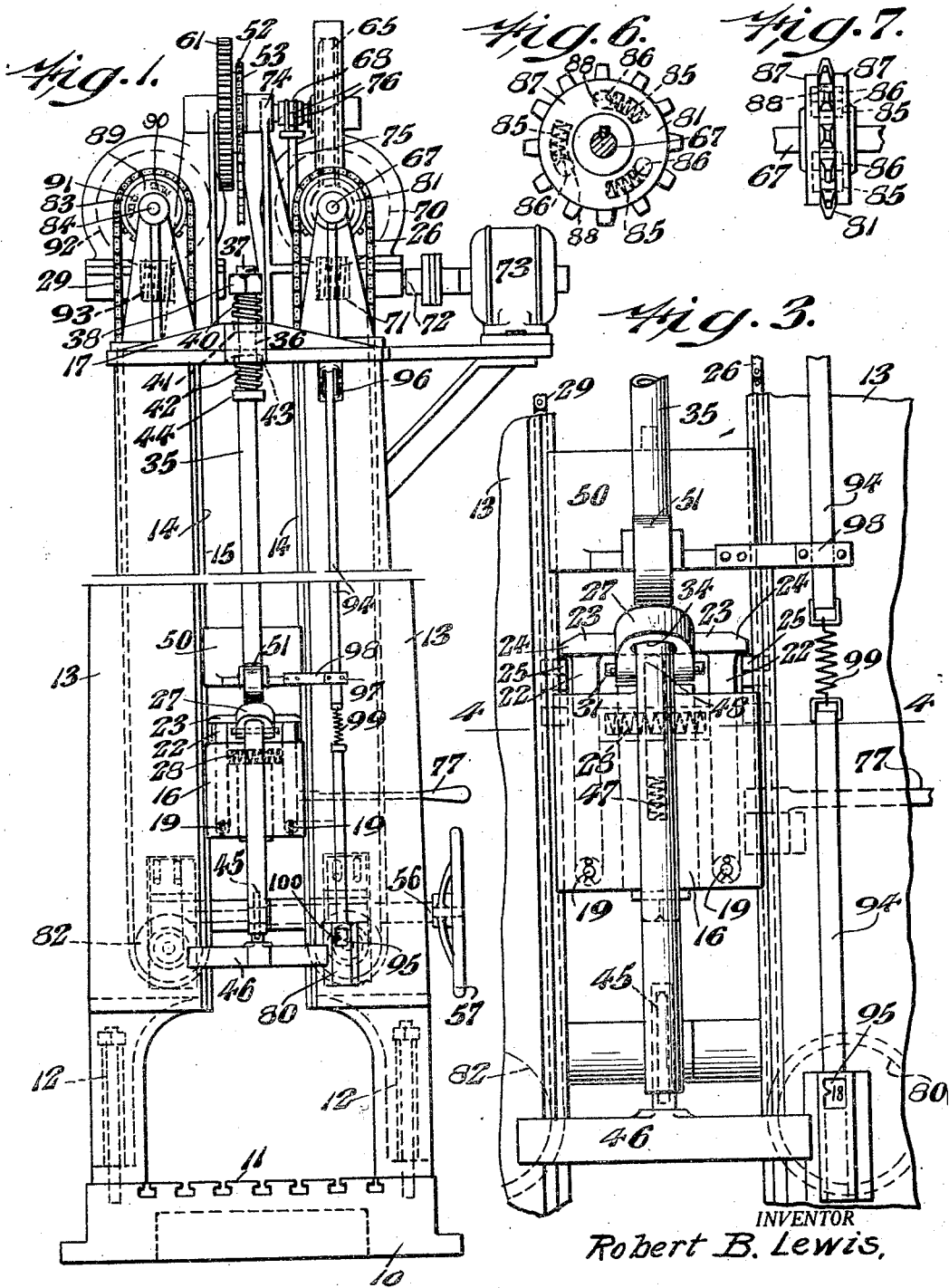
Figure 2:
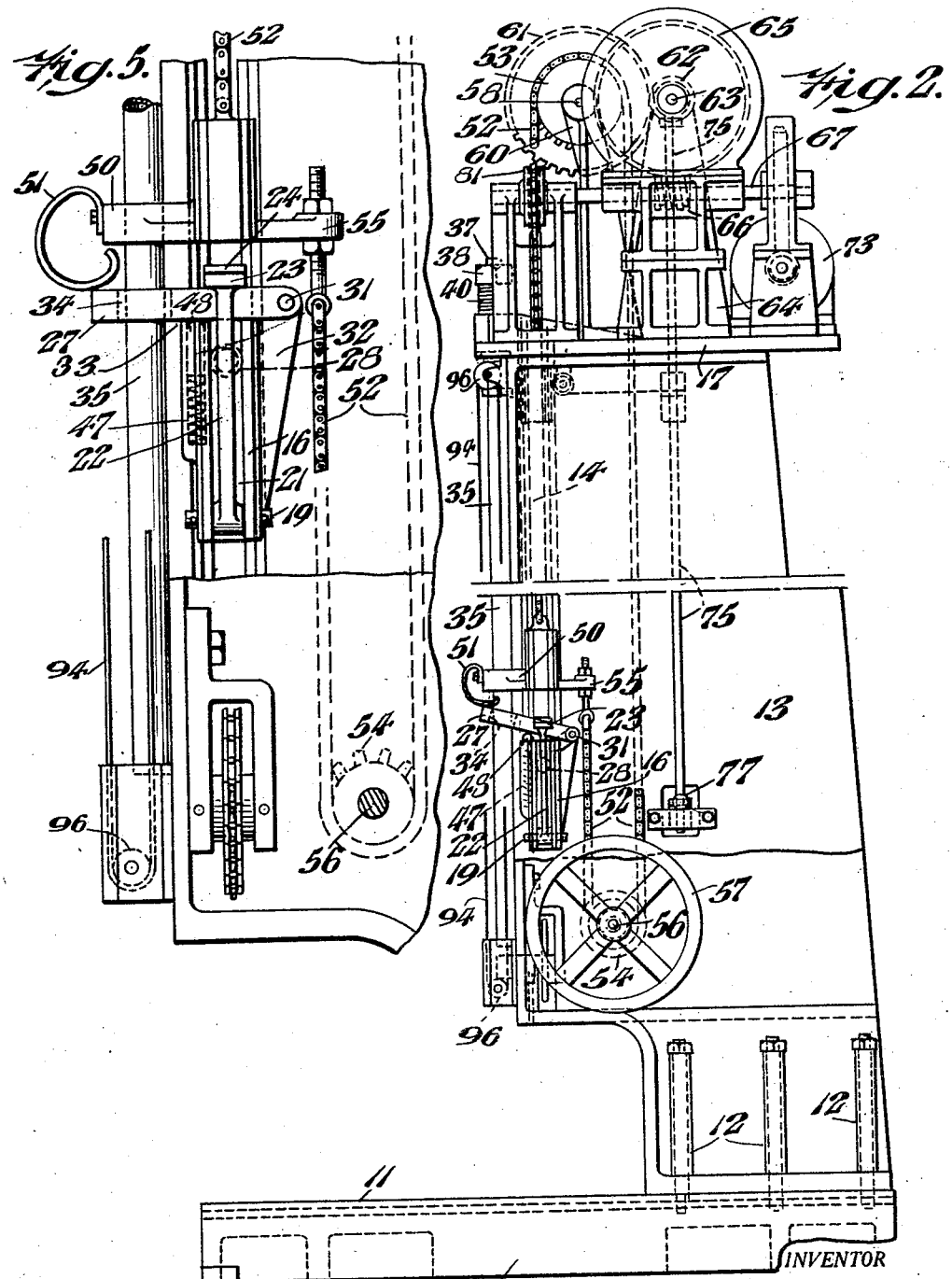
Figure 3:
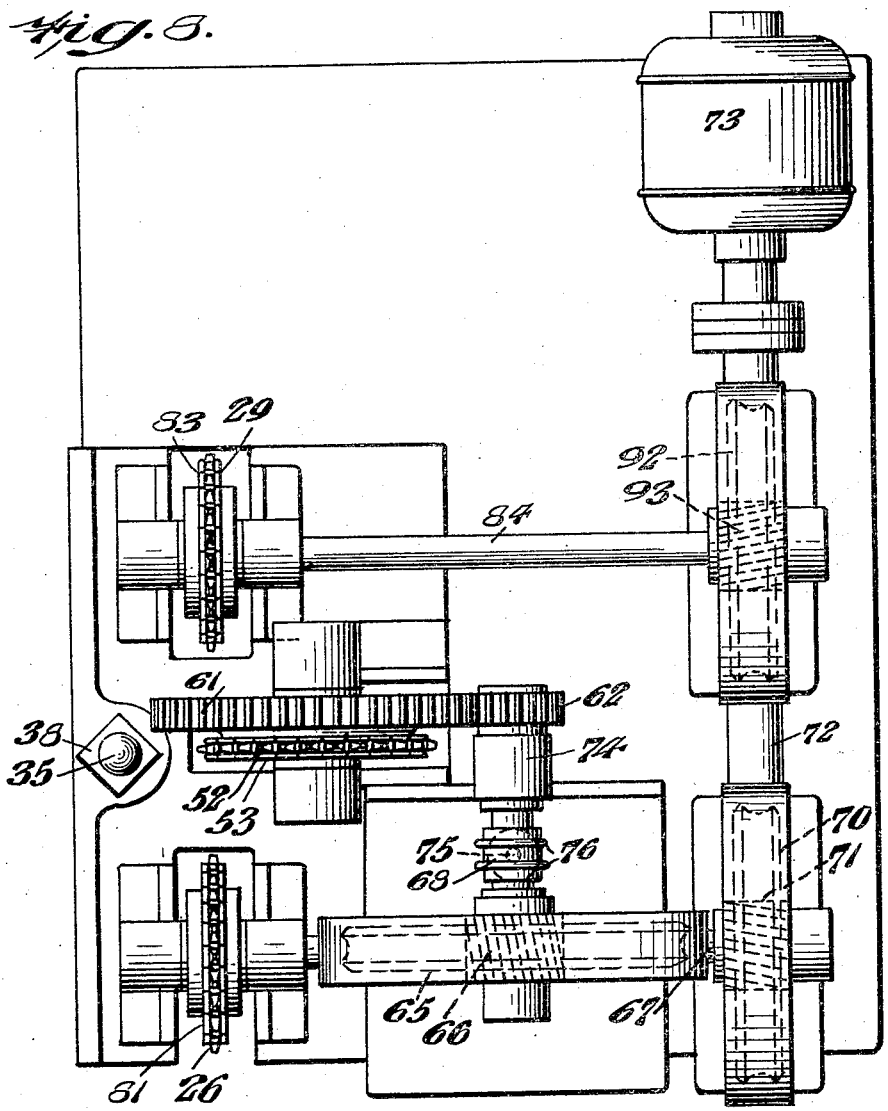
Figure 4:
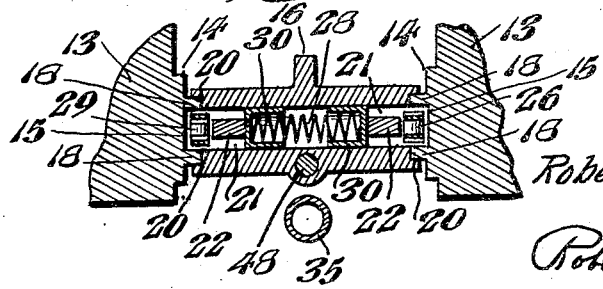

In the accompanying drawings Fig. 1 represents a front elevation of a testing machine embodying one form of the present invention; Fig. 2 represents a side elevation of the same; Fig. 3 represents a detail of the weight and its associated parts drawn upon an enlarged scale; Fig. 4 represents a section on line 4—4 of Fig. 3; Fig. 5 represents a detail in side elevation of the trigger mechanism and its associated parts shown in released position and upon an enlarged scale; Fig. 6 represents a detail in side elevation of one form of sprocket driving mechanism; Fig. 7 represents a front elevation of the parts shown in Fig. 6; and Fig. 8 represents a top plan of the machine.

Referring to the drawings, one form of the present invention is shown comprising a base 10 which provides a horizontal table 11 for supporting the material under test. Rising vertically from the base 10 and rigidly made fast thereto by bolts 12, or other fastening means, are two frames 13 arranged in spaced relation and having two ways 14 respectively forming a vertical passage 15 in which a drop weight or "tup" 16 can travel.

The upper ends of the frames 13 are united by a head plate 17 which serves as a support for certain associated parts of the machine to be hereinafter described.

For accurately locating the drop weight 16 each way 14 is provided with a pair of spaced guides 18 which have free sliding fit respectively in vertically disposed slots 20 in each opposed side of the drop weight 16. In consequence the drop weight 16 is free to travel up and down between the ways 14 but is restrained from lateral movement in all directions. The lifting of this weight 16 a given distance and releasing it to fall by gravity results in the applied impact to the material located upon the table 11 in the path of the falling weight, whereby the dynamic or impact strength of the material is determined.

For the purpose of lifting the drop weight 16 it is provided with two vertically disposed side grooves 21 respectively receiving two lift arms 22 which are pivoted on pins 19 passing through the weight 16 at points located to give a relatively long leverage owing to the arms 22. Thus in the construction shown the lift arms 22 extend vertically upward from pivots at the lower ends while the upper ends terminate respectively in hammer-like heads 23 which project beyond the sides of the arms 22. The two ends of the heads 23 which project outwardly form supporting shoulders 24 to be engaged and lifted by travelling carriers 25 attached respectively to endless lift chains 26 and 29. The supporting face of each of the shoulders 24 is preferably chamfered for sure release of the heads 23 from the carriers 25 though this is not a necessary construction because the flexibility of the chains allows the carriers 25 to yield slightly to an inclined position and thus assist in the movement of the heads toward each other. The two ends of the heads 23 which project inwardly toward each other are arranged to be held in spaced relation by a movable trigger 27, and as long as the trigger 27 is in its operative position between the heads 23 the latter are held apart with the shoulders 24 upon or in the path of the carriers 25. A coil spring 28 is held compressed between tubular seats 30 arranged in juxtaposed relation upon the inner faces respectively of the arms 22, and the tendency of this spring 28 is to exert a pressure to separate the arms 22. This pressure, however is preferably light in order that it will not interfere with or oppose the free swing of the lift arms 22 towards each other when subjected to the direct gravity pull of the weight 16 by the removal of the trigger 27. This trigger 27 is mounted to swing in a vertical plane about a horizontal pivot pin 31 supported by a bracket 32 extending rearwardly from the weight 16, and the location of the pivot 31 is such that when the trigger 27 drops from between the heads 23 its lower face 33 will seat upon the top of the weight 16. Thus the top of the weight 16 becomes an abutment stop for the trigger 27 and serves an important function as will now be explained.

The function of the trigger 27 in addition to actuating and releasing the lift arms 22 is to automatically lock the weight 16 in elevated position as it rebounds from the test piece after a blow or impact. To accomplish this its free end is provided with a hole 34 through which passes a vertically located rod 35 which is suspended from a spring suspension coacting upon the head plate 17. The sides of the hole 34 coacting with the rod 35 serve as one form of connecting means between the trigger 27 and the rod 35. Thus the upper end of the rod 35 passes through a bore 36 in the plate 17 and has a threaded end 37 to receive a nut 38. This nut 38 takes the upward thrust of a coil spring 40 which encircles the rod 35 and seats in a counterbore 41 in the plate 17. A like spring 42 seats in a counterbore 43 at the opposite side of the plate 17 and is compressed against an abutment 44 fixed to the rod 35. The lower end of the rod 35 is guided upon a vertically disposed pin 45 upstanding from a bracket bar 46 fast to the machine frame. Thus while the rod 35 is to all intents anchored against axial movement it is permitted a limited yielding to absorb the shock due to the grabbing action of the trigger 27 upon the rebound of the weight 16. In connection with the relation between the trigger 27 and the rod 35 it should be noted that the diameter of the hole 34 is such that the trigger 27 is free to slide upon the rod 35 when the trigger 27 is in the position to release the weight 16, but binds upon the rod 35 when the trigger 37 is between the heads 23 and subject to the pull of gravity. A push force upwardly applied does not produce binding, as will be evident.

In order to kick the trigger 27 from its horizontal position to its inclined position, the weight 16 is vertically bored to receive a coil spring 47 which acts to hold a plunger 48 against the trigger 27 and projected far enough to return the trigger 27 between the heads 23. The projected position of the plunger 48 relative to the top of the weight 16 is such that plunger 48 is pushed back into the weight 16 before the spring 47 is unduly compressed and hence the blow of the trigger 27 under impact of the weight 16 is dissipated upon the weight top instead of upon the spring 48 with consequent damage to the latter.

For releasing the trigger 27 at a predetermined point during the upward travel of the weight 16, a block 50 is mounted for vertical travel in the ways 14 and carries a trip finger 51 located in the upward path of movement of the free end of the trigger 27. The finger 51 is preferably of relatively stiff spring material which can effectually release the trigger 27 while preventing a solid blow being transmitted to the block 50 and other parts. The block 50 is mounted for vertical movement and for adjustment purposes by suspending it from a chain 52 which passes upward over a sprocket 53 and returns to a level below any possible setting of the block 50 where it passes around a sprocket 54 and has its end made fast to a lateral extension 55 of the block 50.

The sprocket 54 is keyed to a stub shaft 56 suitably journalled to the machine frame and having a hand wheel 57 for manually setting the block 50 to give the desired trip position to the trip finger 51. The sprocket 53 is keyed to a countershaft 58 journalled in standards 60 rising from the head plate 17 and driven by a gear 61 from a pinion 62 keyed upon a shaft 63. This shaft 63 is journalled in standards 64 and loosely mounts a worm gear 65 driven from a worm 66 upon a shaft 67. The rotary motion of the gear 65 is transmitted to the shaft 63 by a clutching means when the movable elements 68 of the clutch which is also keyed to the shaft 63 is thrown to the right, seen in Fig. 1 and hence the sprocket 53 can be driven by power means including a worm gear 70 keyed on the shaft 67, worm 71 on driving shaft 72, and motor 73. When the movable element 68 of the clutch is in the position shown in Fig. 1 the clutch is disengaged from the worm 66 and the sprocket 53 is free to be turned freely by the setting wheel 57. When the movable element 68 of the clutch is thrown to the left (seen in Fig. 1 and Fig. 8) it comes into clutching relation with the fixed bearing hub 74 on the standard 64 and then the shaft 63 with the sprocket 53 are locked in set position. The fixed bearing hub 74 is internally slotted to receive the complemental lugs on the movable element 68 and thus anchor the shaft 63 against rotation when the parts are so engaged. This is a standard clutch construction.

For manually controlling the shifting of the clutch element 68 a vertically journalled control shaft 75 carries a horizontally disposed disc on its upper end by which motion is transmitted to the movable clutch element 68 by an eccentrically mounted pin. The movement of this pin under the rotation of the shaft 63 causes the movable element to shift to neutral or to either of two control positions. This action is brought about by swinging the operating lever 77 in the direction to give the desired result.

As a means for driving the two chains 26 and 29 synchronously each passes around a pair of sprockets arranged one above the other in vertically spaced relation. Thus the chain 26 passes about an idle sprocket 80 journalled near the lower end of the frame and about a driven sprocket 81 loosely mounted on the shaft 67. The chain 29 passes about an idle sprocket 82 also at the lower end of the frame, and about a driven sprocket 83 loosely mounted upon a countershaft 84. As here shown the sprocket 81 is provided with a plurality of slots 85 which respectively receive coil springs 86, the ends of which are anchored respectively in the side plates 87 and are compressed respectively against laterally disposed pins 88 projecting from opposite sides of the sprocket 81. These plates 87 are keyed to the shaft 67 and hence the power is transmitted to the sprocket 81 through the springs 86 acting against the pins 88. The slots 85 are each longer than the diameter of the respective springs 86 so that a limited relative movement is possible between the sprocket 81 and its driving plates 87 and therefore affords a means of absorbing the shock of picking up the weight of the tup or weight 16. The sprocket 83 is similarly driven through slotted plates 89, pins 90 and coil springs 91. The counter-shaft 84 is driven by a worm gear 92 in mesh with a worm 93 on the motor driven shaft 72. The two worms 71 and 93 are respectively right and left threaded so that the two chains 26 and 29 travel in the same direction in the ways 14 and as the gear ratios are the same they also travel at the same speed. Thus as the chains 26 and 29 travel upwardly the carriers 25, which are exactly opposite will simultaneously pick up the lift arms 22 and raise the tup or weight 16 the desired distance, from which it is to drop.

For indicating the height from which the tup or weight 16 is dropped, a band 94 having an indicating distance scale 95 thereon encircles two pulleys 96 arranged one above the other in vertical relation in a convenient location for observation. One portion of the band 94 is fixed at 97 to an extension 98 of the block 50 and in consequence follows the movement thereof. The ends of the band 94 are joined by a stretched spring 99 which serves to maintain the proper tension for the operation of the indicator. The scale 95 is preferably located back of an apertured plate having a pointer 100 at the fixed indicating points. Obviously this indication can be accomplished in many different ways.

In the operation of the testing machine of the present invention it is first necessary to set the trip finger 51 at the proper location to give the weight 16 the predetermined height for dropping. This is done by manually turning the hand wheel 57 so that its motion is transmitted to the sprocket wheel 54 and through the chain 52 to the movable block 50 to bring the latter to the desired point where the trip 51 is to act upon the trigger 27. When this position is reached the lever 77 is actuated to throw the movable element 68 of the clutch to the left as seen in Fig. 1 whereby the set position of the parts is locked against further movement. Instead of setting the block 50 by hand through the medium of the hand wheel 57 it can be set by power means by shifting the movable element 68 into engagement with the gear 65 and then the shaft 63 will be connected to the gear 61 and the shaft 58 receive motion to rotate the sprocket 53 and thus set the block mechanically at its required height. Since the indicating band 94 follows the movement of the block 50 the position of the latter will be indicated in terms of height upon the scale 95 and in this way there is a visual check giving the distance of the fall of the weight 16.

With a test piece in position upon the table 11 and assuming the motor 73 to be transmitting motion to the two synchronously moving chains 26 and 29 the carriers 25 engaging beneath the heads 23 will cause the lift arms 22 and the weight 16 to follow the upward movement of the two chains. During this upward movement the trip 27 is held in its inclined position as shown in Fig. 2 by the upward pressure of the spring pressed plunger 48 and between the heads 23 so that the latter are positively held apart to maintain the proper position of the shoulders 24 above the carriers 25. When the upward travel of the weight 16 brings the trigger 27 into engagement with the trip finger 51 the trigger 27 is swung counter-clockwise about its pivot 31 so that it takes a horizontal position below the plane of the bottom faces of the heads 23 and as a result these heads 23 are now free to move toward each other. This collapsing movement of the heads is brought about by reason of the weight 16 acting to draw them downwardly and force them off of the carriers 25 so that the immediate result is the release of the weight to strike a testing blow. As soon as the weight 16 starts to fall the trigger 27 is disengaged from the trip 51 bringing the spring 47 into action forcing the trigger 27 upward against the lower side of the lifting latch heads 23 and retaining the trigger in a substantial horizontal position thus permitting the free fall of the weight. The trigger 27 and latches 23 maintain this relative position for free fall until the blow is struck at the limit of fall. This impact disturbs this relation causing the spring 47 to be depressed by the inertia of the trigger which is brought to rest on top of weight 16. While the trigger 27 is momentarily at rest on the weight 16 the latch heads 23 separate also by inertia plus the action of the spring 28 leaving sufficient space between them to allow the trigger to be pushed into the gap by the spring 47 thus locking the lifting latch heads 23 into position for engagement with the lifting lugs 25 and leaving the trigger in elevated position to engage the vertical rod 35 at the maximum of rebound and thus hold the weight suspended for the next cycle of operation. The chains 26 and 29 which are continuously rotating again reach a position where a pair of the carriers 25 pick up the heads 23 and the weight 16 is then elevated to its proper height for automatic release by the trip 51. Thus rebound blows ordinarily taking place between testing blows are entirely eliminated and the piece under test is subjected only to positive and known impact blows received from the weight falling from predetermined heights.

It will now be apparent that a complete unitary drop testing apparatus has been devised for physical testing purposes wherein provision is made for subjecting the test piece to a succession of blows of equal or varying intensity and all capable of exact measurement. Furthermore provision is made for automatically absorbing shocks due to operation and preventing them from subjecting the machine frame and its associated parts to unnecessary strains and stresses.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A testing machine comprising a frame, a weight slidably mounted in said frame, a mechanism for lifting said weight and concentrically arranged with respect to the vertical axis of said weight, means to release said weight from said mechanism for gravity impact upon material under test, and inertia controlled means eccentrically arranged with respect to the path of travel of said weight to prevent said weight from striking a rebound impact.

2. A testing machine comprising a frame, a weight slidably mounted in said frame, a mechanism for lifting said weight and operating concentrically thereon, means to release said weight from said mechanism for gravity impact upon material under test, and inertia controlled means to prevent said weight from striking a rebound impact upon said material.

3. In a testing machine of the drop weight type, the combination of a weight, lifting and releasing mechanisms therefore, and inertia controlled means adapted to catch and hold said weight elevated after each testing impact.

4. In a testing machine of the drop weight type, the combination of a weight, lifting mechanism for said weight, a device for releasing said weight from said lifting mechanism, means to catch and hold said weight elevated upon rebound after each testing impact, and means to absorb the shock of said catching means.

5. In a testing machine of the drop weight type, the combination of a weight, lifting mechanism for said weight, a device for releasing said weight from said lifting mechanism, means to catch and hold said weight elevated upon rebound after each testing impact, and means released by inertia for rendering said catching means operative.

6. In a testing machine of the drop weight type, the combination of a weight, lifting devices movably mounted at opposite sides of said weight, supporting elements carried by said weight for respectively cooperating with said lifting devices, means including a trip for releasing said elements from said lifting devices, and means including a lever carried by said weight to catch and hold said weight elevated after each testing impact.

7. In a testing machine of the drop weight type, the combination of a weight, lifting devices movably mounted at opposite sides of said weight, supporting elements carried by said weight to be respectively engaged by said lifting devices and being arranged to move toward and away from said lifting devices for release and reset purposes, means including a trip for realeasing said elements from said lifting devices, inertia controlled means for catching and holding said weight elevated after a testing impact, and means operating to reset said supporting elements for a succeeding lifting operation.

8. In a testing machine of the drop weight type, the combination of a weight, lifting devices movably mounted at opposite sides of said weight, supporting arms pivoted to said weight for respectively cooperating with said lifting devices, a relatively movable element carried by said weight and normally holding said arms spaced apart to be engaged by said lifting devices, means actuated at a predetermined point in the upward travel of said weight to remove said element from said arms and release said weight to fall by gravity, and restoring means operated by the impact of said weight to replace said element for holding said arms in spaced relation.

9. In a testing machine of the drop weight type, the combination of a weight, lifting devices movably mounted at opposite sides of said weight, supporting arms pivoted to said weight for respectively cooperating with said lifting devices, a relatively movable element carried by said weight and normally holding said arms spaced apart to be engaged by said lifting devices, means actuated at a predetermined point in the upward travel of said weight to remove said element from said arms and release said weight to fall by gravity, restoring means operated by the impact of said weight to replace said element for holding said arms in spaced relation, and means to catch and hold said weight elevated after each testing impact.

10. In a testing machine of the drop weight type, the combination of a weight, lifting devices movably mounted at opposite sides of said weight, supporting arms pivoted to said weight for respectively cooperating with said lifting devices, a relatively movable element carried by said weight and normally holding said arms spaced apart to be engaged by said lifting devices, means to withdraw said element to release said arms from said lifting devices, and frictional means to hold said arms in released position for a predetermined part of the downward travel of said weight.

11. In a testing machine of the drop weight type, the combination of a weight, lifting mechanism for said weight, a device for releasing said weight from said lifting mechanism, a fixed part adjacent the travel of said weight, and means carried by said weight and actuated by the impact thereof for gripping said fixed part to support said weight in rebound position.

12. In a testing machine of the drop weight type, the combination of a weight, lifting mechanism for said weight, a device for releasing said weight from said lifting mechanism, a fixed part adjacent the travel of said weight, means carried by said weight and actuated by the impact thereof for gripping said fixed part to support said weight in rebound position, and means for cushioning the shock imparted to said fixed part.

13. In a testing machine of the drop weight type, the combination of a weight, lifting mechanism for said weight, a device for releasing said weight from said lifting mechanism, a vertically spring suspended rod mounted adjacent the travel of said weight, means to confine said rod to axial movement only, and means carried by said weight and actuated by the impact thereof for gripping said rod to support said weight in rebound position.

14. In a testing machine of the drop weight type, the combination of a weight, lifting mechanism for said weight, a device for releasing said weight from said lifting mechanism, a rod adjacent the travel of said weight, a movable element carried by said weight and projecting into close proximity to said rod, spring means for urging said movable element into a position to contact said rod so as to be movable relative to said rod in one direction only, and means for restraining said movable element from the action of said spring means and inertia controlled for releasing said movable element to the action of said spring means.

Signed at Philadelphia, county of Philadelphia, State of Pennsylvania, this 16th day of April, 1930.

ROBERT B. LEWIS.